United States Patent [19]
Fyfe et al.

[11] Patent Number: 5,428,666
[45] Date of Patent: Jun. 27, 1995

[54] AUTOMATIC NUMBER ASSIGNMENT MODULE SELECTION FOR MOBILE TELEPHONE

[75] Inventors: Kipling W. Fyfe, Calgary; Susan McIntyre, Vancouver, both of Canada

[73] Assignee: NovAtel Communications, Ltd., Calgary, Canada

[21] Appl. No.: 292,300

[22] Filed: Aug. 16, 1994

Related U.S. Application Data

[63] Continuation of Ser. No. 121,443, Sep. 14, 1993, abandoned, which is a continuation of Ser. No. 39,513, Mar. 29, 1993, abandoned, which is a continuation of Ser. No. 937,459, Aug. 28, 1992, abandoned, which is a continuation of Ser. No. 679,268, Apr. 2, 1991, abandoned.

[51] Int. Cl.$^6$ .......................................... H04M 11/00
[52] U.S. Cl. ........................................ 379/58; 379/59; 379/60; 379/61; 455/33.1; 455/54.1
[58] Field of Search ...................... 379/58, 59, 60, 61; 455/11, 17, 33.1, 54.1

[56] References Cited

U.S. PATENT DOCUMENTS

| | | | |
|---|---|---|---|
| 3,663,762 | 5/1972 | Joel, Jr. .................................. | 379/60 |
| 4,242,538 | 12/1980 | Ito et al. ................................... | 379/60 |
| 4,658,435 | 4/1987 | Childress et al. ...................... | 455/17 |
| 4,677,653 | 6/1987 | Weiner et al. . | |
| 4,734,928 | 3/1988 | Weiner et al. .......................... | 379/59 |
| 4,775,998 | 10/1988 | Felix et al. .............................. | 379/59 |
| 5,003,629 | 3/1991 | Ness-Cohn et al. ................... | 455/54 |
| 5,020,091 | 5/1991 | Krolopp et al. ........................ | 379/58 |
| 5,029,233 | 7/1991 | Metroka ................................. | 455/11 |
| 5,044,010 | 8/1991 | Frenkiel et al. ........................ | 379/61 |
| 5,101,500 | 3/1992 | Mauri .................................... | 455/33 |

OTHER PUBLICATIONS

The Bell System Technical Journal, "The Cellular Concept," Jan., 1979, vol. 58, No. 1.
User Manual for a telephone from Technophone Ltd., dated Sep., 1989.
Motorola, "Your Portable Connection", Jan., 1989.
Nokia–Mobira Incorporated, "Nokia LXIIC", May 1990.
Washington Post, Aug. 10, 1990.

*Primary Examiner*—Curtis Kuntz
*Assistant Examiner*—William Cumming
*Attorney, Agent, or Firm*—Cesari and McKenna

[57] ABSTRACT

A mobile radio-telephones having a plurality of number assignment modules ("NAM's") selects automatically one of the NAM's for use for communication. In a preferred embodiment, the mobile radio-telephone attempts to match system identification data in received control signals with system identification data stored in the NAM's, and, on encountering a match, will use the NAM containing the matched system identification for telephone communication.

16 Claims, 2 Drawing Sheets

AUTOMATIC NUMBER ASSIGNMENT MODULE SELECTION FOR MOBILE TELEPHONE

This is a continuation application of U.S. Ser. No. 08/121,443 filed Sep. 14, 1993, now abandoned, which is a continuation application of U.S. Ser. No. 08/039,513 filed Mar. 29, 1993, now abandoned which is a continuation of U.S. Ser. No. 07/937,459 filed Aug. 28, 1992, now abandoned, which is a continuation of U.S. Ser. No. 07/679,268 filed Apr. 2, 1991 now abandoned.

FIELD OF THE INVENTION

This invention relates generally to telecommunication, and more particularly to mobile telephones having a plurality of number assignment modules, each designating a cellular system to which the mobile telephone subscribes.

BACKGROUND OF THE INVENTION

Cellular telephone systems provide radio communication between a network of geographically separated, stationary base stations and mobile radio-telephones, e.g., mobile units installed in automobiles. Each base station defines a particular cell of the cellular system, and has at least one transceiver with the capability of calling to and receiving calls from mobile units in the corresponding cell. Such a cellular telephone system is described in the Bell System Technical Journal, January 1979, entitled, "The Cellular Concept," page 15, et seq.

Cellular telephone systems are subject typically to governmental regulations and approvals, and must comply with standards, such as, for example, those set forth for the United States of America in EIA RS-553 by Electronic Industries Association, Washington, D.C., U.S.A.

As set forth in those standards, a central authority assigns a unique digital code for identifying each cellular telephone system, called the system identification code ("SID"). When a mobile unit subscribes or registers for service on a particular cellular system, that system is called its "home" system.

A number assignment module ("NAM") on-board the mobile telephone stores the SID that identifies the mobile unit's home system, called the "$SID_p$," in a non-volatile, i.e., permanent, memory. The NAM also stores a mobile identification number (MIN), which represents the mobile unit's 10-digit telephone number, in association with the $SID_p$.

Typically, a cellular telephone system allocates to each base station a plurality of radio channels to carry voice signals (called "voice channels"), and at least one control channel. In turn, the base station assigns the allocated voice channels to mobile units for use during voice telephone calls.

The assignments of the voice channels are made in response to requests from the mobile units to the base stations for communication service. Typically, the mobile units request service from the home-system base stations from which the mobile units receive the strongest control signals over the control channels.

More specifically, a mobile unit typically "scans" for service, i.e., the mobile unit scans the strengths of control signals on pre-determined control channels, and, for instance, selects the channel having the strongest signal for further processing. The mobile unit then examines the selected control signal to determine if it originated from a base station belonging to the mobile unit's home system.

Typically, this is accomplished by the mobile unit extracting and examining the data contained in an overhead message train ("OMT") contained within the selected control signal. Each OMT contains system information including the system identification code ("$SID_r$") of the base station from which it was broadcasted. The mobile unit compares the extracted $SID_r$ with the mobile unit's stored $SID_p$. If the two codes match, the mobile unit sends a request over the corresponding control channel to the base station for the assignment of a voice channel, and two-way communication can ensue over the assigned voice channel.

On the other hand, if the two codes do not match, then the mobile unit must wait until an acceptable control signal is received, which may require that the mobile unit move to another cell, or that the mobile unit resort to roaming to establish telephone communication.

In roaming, the mobile unit uses the services of a "foreign" cellular system, i.e., a system that is not its home system, and, unfortunately, the mobile unit incurs roaming fees for such services. Moreover, roaming is only available where the home system has a roaming contract with the foreign system. Thus, in certain areas outside the coverage area of the home system, or where communication with home-system base stations proves impossible or inadequate due to signal propagation conditions or other reasons, and where roaming is not available because there is no inter-system roaming agreement between the home and local cellular systems, cellular services are not available. The unavailability of service in those locales can present serious drawbacks to telephone users.

It has been proposed to provide mobile radio-telephones with multiple NAM's, each storing a MIN and an associated $SID_p$. This permits the mobile unit to subscribe for service on several cellular systems. In essence, the mobile unit has many different phone numbers, and can have many different home systems, each associated with one of the phone numbers. In all known approaches, the mobile unit can have, however, only a single NAM operative at a time.

For instance, U.S. Pat. No. 4,734,928, suggests the use of multiple NAM's, which the telephone user manually switches into operation, e.g., whenever the user desires service from a different home system, or desires to take advantage of inter-system roaming agreements of a different home system.

Consequently, a mobile unit equipped with multiple NAM's can provide the user with service over a broader geographic range of use. In addition, the user can avoid paying roaming charges by subscribing with a foreign system as a second home system. This may permit many users to almost always be within one of its home systems. Furthermore, the user can take advantage of billing-rate differences offered by its various home systems so as to reduce telephone call charges.

Unfortunately, manually switching from one to another of the NAM's in a mobile unit requires that the user maintain a good working knowledge of the cellular systems, including their geographic boundaries. For at least that reason, many users might find manual switching of NAM's too complicated or bothersome.

SUMMARY OF THE INVENTION

The invention resides in techniques for use by a multi-NAM mobile radio-telephone for automatically selecting one of the NAM's for telephone communication. In making the selection, the mobile unit attempts to match system identification data in received control signals with system identification data stored in conjunction with any of the NAM's, and, on encountering a match, will switch to the NAM containing the matched system identification for telephone communication.

More specifically, in a preferred embodiment, the mobile unit (i) scans certain control channels identified by system information stored on-board in conjunction with a first of its NAM's to identify the strongest control signal, (ii) extracts system identification data therefrom, and (iii) attempts to match that data to system identification data stored in conjunction with the first NAM. If a match exists, that NAM is used for communication, and, if no match exists, the mobile unit switches consecutively to a other NAM's and repeats the procedure for each until a match is found.

A NAM priority directory or look-up table stored on-board the mobile unit in non-volatile memory determines the order in which the mobile unit examines the NAM's for a match. Preferably, the priority order can be user-set to reflect user preferences between cellular systems based on, e.g., telephone charges and fees, services provided and other considerations.

If none of the NAM's provide a match, the mobile unit can seek telephone service using a designated one of the NAM's for roaming. Preferably, the designated NAM is also stored in non-volatile memory in the mobile unit, and the user makes the designation from among the available NAM's, based on, e.g., the prevalence of inter-system roaming agreements, roaming charges, coverage area and other considerations.

With automatic NAM selection, the mobile unit switches NAM's into and out of operation without user intervention. In addition, for the reasons described above, the invention can achieve cost savings in connection with use of mobile radio-telephones.

BRIEF DESCRIPTION OF THE DRAWING

The above and further advantages of the invention may be better understood by referring to the following description in conjunction with the accompanying drawings, in which.

DETAILED DESCRIPTION OF ILLUSTRATIVE EMBODIMENT

Figure 1:
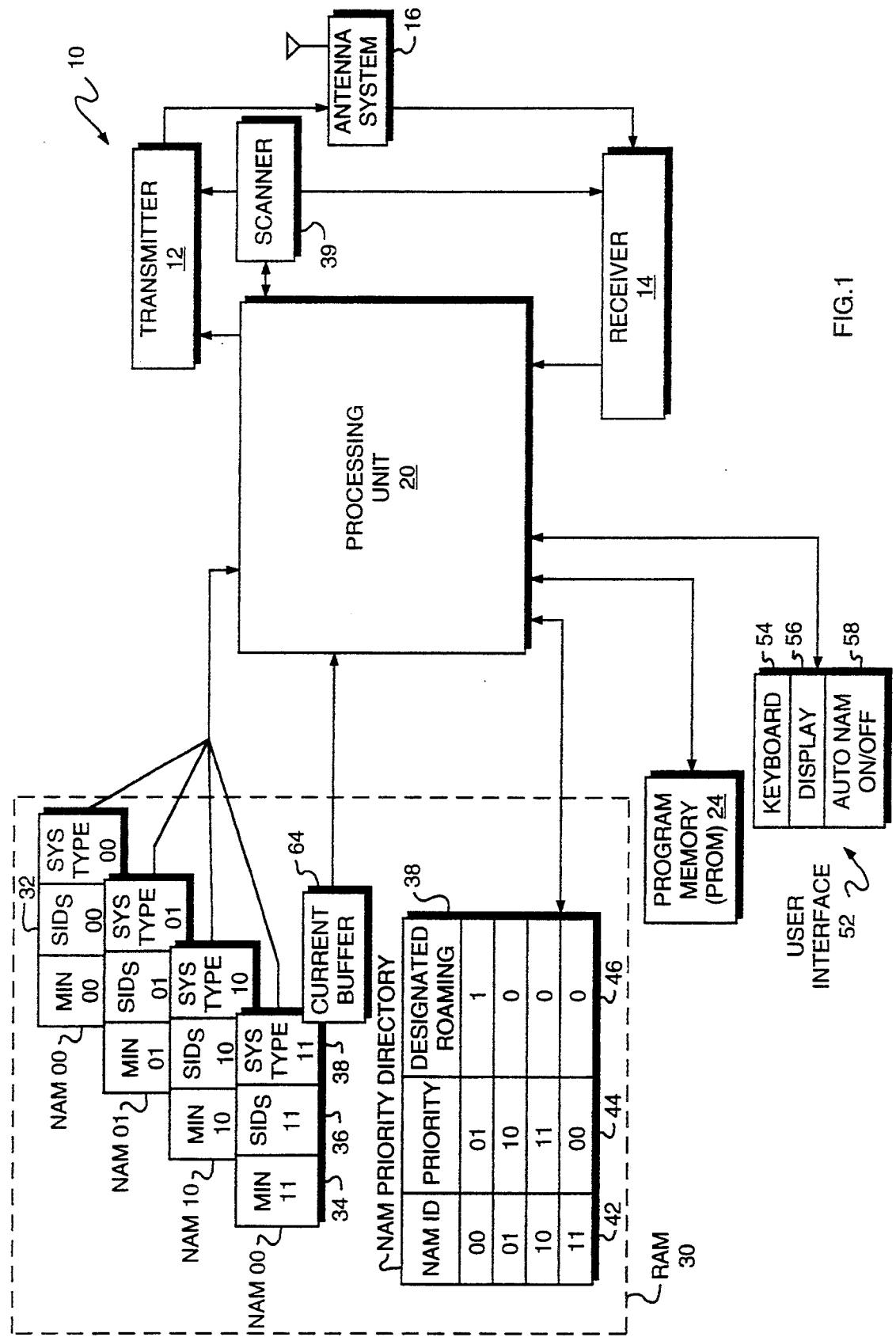
FIG. 1 is a block diagram of a mobile radio-telephone employing automatic number assignment module selection in accordance with the invention.

FIG. 1 shows a mobile radio-telephone 10 employing automatic number assignment module selection in accordance with the invention. The radio-telephone 10 has a transmitter 12 and a receiver 14 for respectively transmitting and receiving communication signals via an antenna system 16 equipped for full duplex operation.

The radio-telephone 10 also has a processing unit 20 for controlling operation of the transmitter 12 and receiver 14 in accordance with a program stored in a program memory 24, preferably a programmable read only memory ("PROM").

A non-volatile, random access memory ("RAM") 30 stores information required for the operation of the radio-telephone 10, including a plurality of number assignment modules ("NAM's") 32 and information relating to NAM's 32. More specifically, and for purposes of illustration only, the RAM 30 has four NAM's 32, designated NAM 00, NAM 01, NAM 10, AND NAM 11. (Generally speaking, however, the RAM 30 can store "n" NAM's 32, where n is a positive integer greater than 1.)

Each NAM 32 includes a first field 34 for storing a representation of a unique mobile telephone identification number ("MIN"), a second field 36 for storing a representation of a system identification code ("$SID_p$") (each $SID_p$ being different from those stored in the other NAM's 32), and a third field 38 for storing a representation of the "type" of the system.

As set forth in the above-mentioned EIA RS-553 standards, the systems can be either "A" type or "B" type. "A" type systems use channels 0 through 333, of which channels 313 to 333 are control channels, which are typically scanned for service by scanner 39 of the mobile unit 10 in descending order. On the other hand, "B" type systems use channels 334 through 666, of which channels 334 to 354 are control channels, which are typically scanned for service in ascending order by mobile units.

More specifically, NAM 00 stores MIN 00, $SID_p$ 00 and Sys. Type 00; NAM 01 stores MIN 01, $SID_p$ 01, and Sys. Type 01; NAM 10 stores MIN 10, $SID_p$ 10 and Sys. Type 10; and NAM 11 stores MIN 11, $SID_p$ 11 and Sys. Type 11.

The RAM 30 also has a further set of fields 38 for storing a NAM priority directory or look-up table. The NAM priority directory cross-references each NAM 32 with a priority ranking, and, in a preferred embodiment, identifies the NAM 32 which is to be used by the radio-telephone 10 during roaming.

More specifically, the NAM priority directory has a first set of fields 42 for storing NAM identification codes or "NAM ID's" (i.e., in the above example, the above-mentioned 00, 01, 10, and 11), and a second set of fields 44 for storing an assigned priority in association with each NAM identification code (e.g., 00 for the lowest priority and 11 for the highest priority).

The directory also has a third set of fields 46 for storing a designated roaming identification in association with each NAM identification code. The NAM that is to be used during roaming has a digital ONE in its associated designated roaming field 46, while the other NAM's have a digital ZERO in that field.

The radio-telephone 10 further includes a user interface 52 for interacting with the processing unit 20. The user interface 52 can include a conventional keyboard 54 and display 56. In addition, the user interface 52 provides other user-activated controls, such as an on-/off toggle 58 for disabling and enabling automatic NAM selection. The on/off toggle 58 can be implemented as a discrete switch, a keyboard function key or as a software routine executable by the processing unit 20 in response to a user selection that is entered, e.g., on the keyboard 54.

When automatic NAM selection is disabled, the radio-telephone 10 employs the NAM identified by the CURRENT NAM ID stored in a current buffer 64 as described hereinabove, and ignores the other NAM's stored in RAM 30.

On the other hand, when automatic NAM selection is enabled, the radio-telephone 10 can make use of any of the NAM's stored in the RAM 30 in accordance with an automatic NAM selection routine that is stored in the program memory 24.

Figure 2:
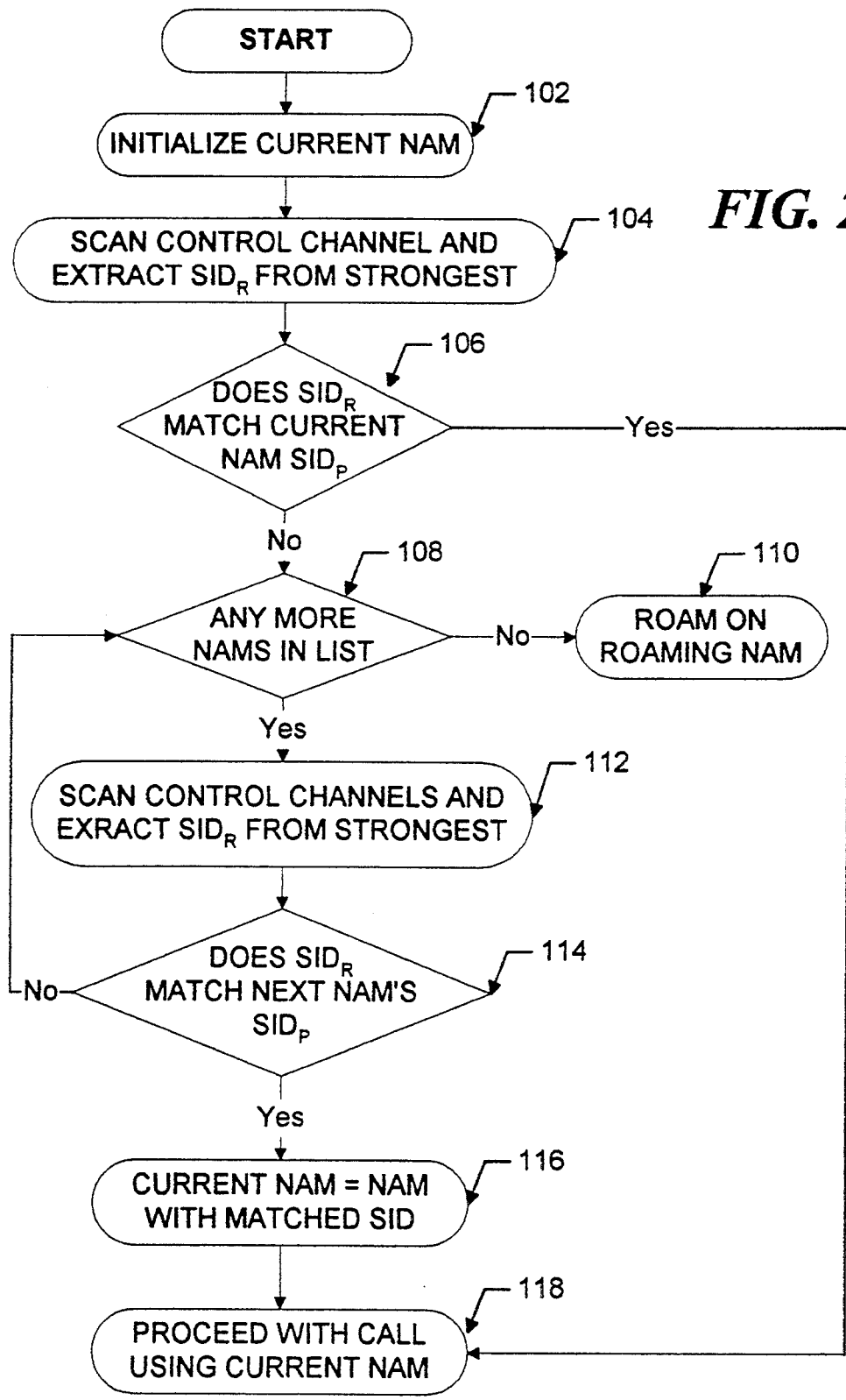
FIG. 2 is a flow chart depicting operation, including automatic number assignment module selection, of the mobile radio-telephone of FIG. 1.

FIG. 2 illustrates operation of the radio-telephone 10, including automatic selection, in accordance with the invention. With automatic NAM selection enabled, and in order to initiate a telephone call, the mobile unit 10 initializes the CURRENT NAM in block 102 by defining the CURRENT NAM as the last NAM used by the radio-telephone for communication. That NAM is identified by accessing register 64. Alternatively, the CURRENT NAM can be defined as the NAM with the highest priority in the directory 38.

Then, in block 104, the processing unit 20 scans the control channels indicated by, and in the direction indicated by, the system type specified in the CURRENT NAM's third field 38. (The identification of these channels and the direction of scanning for type A and type B systems can be stored in fields (not shown) of the RAM 30.) Then, the processing unit 20 extracts the $SID_r$ from the OMT of the strongest of the control signals received over the scanned channels, and, in block 106, checks whether the extracted $SID_r$ matches the $SID_s$ stored in RAM 30 for the CURRENT NAM.

If the $SID_r$ does not match the CURRENT NAM's $SID_s$, then, in block 108, the processing unit 20 determines whether any NAM's have not been checked. If the outcome of this test is that all NAM's have been checked, the radio-telephone 10 commences roaming in block 110 using, for example, the NAM designated for roaming in the NAM priority directory 38.

On the other hand, if not all NAM's have been checked, the radio-telephone 10 repeats the scanning step in block 112, this time over control channels indicated by, and in the direction indicated by, the system type specified in the NAM which is next in priority to those already examined, as indicated in the priority directory 38. The processing unit 20 extracts the SID from the strongest of the scanned controls signals.

Then, in block 114, the extracted $SID_r$ is compared with the $SID_s$ stored in RAM 30 for this next NAM. If they do not match, then the radio-telephone 10 returns to block 108 and checks whether any untested NAM's remain. On the other hand, if the extracted $SID_r$ matches the $SID_s$ for that NAM, then, in block 116, that NAM is made the CURRENT NAM.

After block 116, or if a match were found in block 106, the mobile unit 10 proceeds in block 118 with the telephone call using the CURRENT NAM and a voice channel assigned by the base station that originated the particular control signal whose $SID_r$ was being tested for a match.

An example may further clarify the operation of automatic NAM selection in accordance with the invention. Consider a hypothetical metropolitan area served by four cellular telephone systems, denominated as S1, S2, S3, and S4. The systems have contiguous, overlapping cells, respectively numbered C1, C2, C3, and C4, located side-by-side. Each cell is served by a base station of the corresponding system.

It should now be apparent that each of the systems is associated with a system type, a control channel range, an order of scanning control channels, a specific control channel for the local base station, and a system identification or $SID_r$. This information is given in the following systems table:

| SYSTEM NO. | SYSTEM TYPE | CELL CONTROL CHANNELS | CHANNEL RANGE | $SID_r$ |
|---|---|---|---|---|
| S1 | A | 315 | 313–333 | 12345 |
| S2 | B | 340 | 334–354 | 22222 |
| S3 | B | 342 | 334–354 | 54321 |
| S4 | A | 331 | 313–333 | 44444 |

For the example, a user subscribes to all four systems, and has an automobile-mounted mobile unit with four NAM's and otherwise incorporating the features shown in FIG. 1. As noted above for radio-telephone 10, the mobile unit 100 stores data representing various NAM parameters for each of the NAM's, which, for our purposes here, are set forth in the following NAM table:

| NAM NO. | SYSTEM TYPE | CHANNEL RANGE | $SID_P$ |
|---|---|---|---|
| N1 | B | 334–354 | 22222 |
| N2 | A | 333–313 | 44444 |
| N3 | B | 334–354 | 54321 |
| N4 | A | 333–313 | 12345 |

Continuing the example, the user lives within cell C1 of S1 and works within cell C4 of S2, and thus must pass from C1 to C2 to C3 and finally to C4 on the way to work.

On a particular day, the user turns ON the mobile unit 100 while at his home, and drives to his office. On being turned ON, the mobile unit 100 initially has, for instance, N1 as its CURRENT NAM, and scans the control channels associated with that NAM, starting with channel 334, as indicated in the NAM table for N1, to identify the strongest control signal carried over those control channels. Since the local system, S1, is an A type system, while N1 corresponds to a B type system, the mobile unit 100 will not find that the scanned control channels contain control signals.

Using automatic NAM selection, the mobile unit 100 will switch to the next NAM in its priority directory, say, N2, as its CURRENT NAM, and repeat the foregoing procedure, except that, this time, the mobile unit scans downwardly from 333, and identifies channel 315 as providing the strongest control signal. Next, the mobile unit 100 compares the SID received in the overhead message train of the channel 315 signal, i.e., 444444, with the SID stored for N2, i.e., 12345.

Since the two SID's do not match, the mobile unit 100 switches to the next NAM in the priority directory, e.g., N3. NAM N3 corresponds to a B type system, so the mobile unit scan will again not result in any control signal.

On the other hand, the next NAM, N4, corresponds to an A type system, and channel 315 will again be identified by the scan. This time, however, the SID carried by the control signal's OMT will match the SID for N4, i.e., 12345. Accordingly, phone service can commence using NAM N4.

In accordance with standards, the mobile unit 100 periodically verifies signal strength adequacy by repeating the foregoing procedure. This is important because, as the user drives to work, the user passes out of the cell C1 of S1 and, in the example, into C2 of S2. Accordingly, as the user does so, signal strength will decrease, and the mobile unit 100 will need to once again identify a suitable NAM, this time for use in system S2. Without further explanation, it should now be clear that NAM N1 will provide a suitable hit (i.e., match) on the corresponding SID's and can be used for cellular service in C2.

Of course, it is possible that no match will occur in certain geographic areas for any of the NAM's, i.e., the mobile unit 100 is outside the service areas of all the systems to which it subscribes. Then, in that case, the mobile unit 100 uses the designated roaming NAM for roaming.

If the user chooses to disable automatic NAM selection for any reason, the user can do so using the appropriate switch or toggle on the user interface. When automatic selection is disabled, the mobile unit 100 then resorts to using a single NAM, e.g., the NAM with the highest priority in the priority directory.

In a variation of the procedure described above for scanning for service, the mobile unit 100 can compare the SID extracted from the OMT of the control signal identified in each scan with the SID stored in all of the NAM's, making the comparison in the order of NAM priority specified in the directory. This avoids the necessity of scanning each time a new NAM is selected.

In another variation, the mobile unit 100, as a result of scanning, can identify plural control channels carrying adequately strong signals (rather than the single strongest control channel as in the above example), and compare the extracted SID for each channel with the SID stored in the CURRENT NAM. In this case, the mobile unit preferably compares the extracted SID for the strongest channel first, and proceeds to compare the SID's of less strong channels in the descending order of their signal strengths, prior to switching to a next NAM if no match is found.

Moreover, in a further variation, roaming service can be obtained by, instead of using only a single designated NAM as described above, repeating the scanning as described for non-roaming service, starting with the CURRENT or the designated NAM and continuing with other NAM's as needed until a system providing roaming service can be obtained.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A mobile radio-telephone capable of requesting communication services from any of a plurality of cellular telephone systems that each transmit and receive data over a plurality of voice channels and a plurality of control channels, said radio-telephone comprising:
    (A) a tunable transceiver for sending and receiving a plurality of signals over a plurality of the channels, the signals received over the control channels including a plurality of control signals each of which is characterized by a signal strength;
    (B) a memory which includes a plurality of number assignment modules, each of said number assignment modules storing data specifying (i) a mobile identification number, (ii) a system identification number that identifies an associated cellular telephone system from which communication services can be requested using the mobile identification number, and (iii) a predetermined range of the plurality of control channels;
    (C) scanning means coupled with said transceiver and said memory for scanning control channels, said scanning means scanning the control channels within the range specified in a selected number assignment module and identifying from the control channels scanned the control channel that has the strongest received control signal, said control channel with the strongest control signal being an identified control channel;
    (D) a processor for comparing (i) a system identification number that identifies the cellular telephone system associated with the identified control channel, the system identification number being derived from control signals received over the identified control channel, and (ii) the system identification number specified in the selected number assignment module, said processor responding to a correspondence between the numbers by causing said transceiver to tune to the identified control channel and request service using the mobile identification number stored in the selected number assignment module.

2. The mobile radio-telephone of claim 1, wherein said processor includes a selection means for selecting a next number assignment module for said scanning means, said selection means selecting a next number assignment module if the system identification number from the number assignment module previously selected does not correspond to the system identification number derived from the identified control channel.

3. The mobile radio-telephone of claim 2, wherein said memory includes means for storing order-specifying data that specify an order in which said selection means selects the number assignment modules.

4. A mobile radio-telephone capable of requesting communication services from any of a plurality of cellular telephone systems, each system having a plurality of base stations, each base station having a plurality of voice channels and a plurality of control channels, said radio-telephone comprising:
    (A) a tunable transceiver for sending and receiving signals over a plurality of channels;
    (B) a plurality of number assignment modules, each number assignment module storing data specifying (i) a mobile identification number, (ii) a system identification number of an associated cellular telephone system from which communication services can be requested using the mobile identification number, and (iii) a predetermined range of the plurality of control channels;
    (C) scanning means coupled with said transceiver for scanning the control channels within the range specified in a selected number assignment module, and identifying from the channels scanned the control channel that has the strongest received control signal;
    (D) a processor coupled to said transceiver and said scanning means for
        i. determining if a system identification number derived from the strongest received control signal corresponds to the system identification number derived from the selected number assignment module;
        ii. causing, if the numbers correspond, said transceiver to tune to the control channel with the strongest control signal and request communication service from the associated cellular telephone system using the mobile identification number derived from the selected number assignment module; and iii. determining, if the numbers do not correspond, whether the system identification number derived from the strongest received control signal corresponds to the system identification number stored in a next number assignment module, the processor repeatedly selecting a next number assignment module either until a correspondence of system identification numbers is determined, said processor then causing said transceiver to tune to the associated control channel and request service using the mobile identification number specified in the associated selected number assignment module, or until the all of the number assignment modules have been selected.

5. The mobile radio-telephone of claim 4 further comprising means for storing, for each of the number assignment modules, order-specifying data for specifying a pre-determined order in which the control channels specified therein are to be scanned by said scanning means, wherein said scanning means consecutively scans control channels specified in the selected number assignment module in the order specified by the associated order-specifying data.

6. The mobile radio-telephone of claim 4, further comprising means for storing data specifying the order in which the number assignment modules are to be selected by the processor.

7. The mobile radio-telephone of claim 6, wherein said processor, if the system identification numbers do not correspond, selects a next number assignment module for said scanning means.

8. The mobile radio-telephone in accordance with claim 7 further comprising means for storing data specifying for each of the number assignment modules an associated order in which the channels specified therein are to be scanned.

9. The mobile radio-telephone in accordance with claim 4, further comprising memory means, coupled to said processor, for storing a designation of one of said number assignment modules for use during roaming.

10. In a mobile radio-telephone capable of requesting communication services from any of a plurality of cellular telephone systems, each system having a plurality of voice channels and a plurality of control channels, a method for requesting communication service from one of said cellular telephone systems comprising the steps of:

(A) in each of a plurality of number assignment modules, storing data specifying a mobile identification number, a system identification number for an associated cellular telephone system from which communication services can be requested using said mobile identification number, and a range of channels within the plurality of control channels;

(B) scanning the control channels specified in a first selected number assignment module;

(C) identifying from the control channels scanned the channel that has the strong received control signals;

(D) determining whether a system identification number derived from the strongest received control signals matches the system identification number derived from the selected number assignment module; and (E) if the numbers match, tuning to the control channel identified in step C and requesting communication service from the associated cellular communication system using the mobile identification number stored in the selected number assignment module.

11. The method of claim 10, further including the steps of:

(F) selecting a next number assignment module and scanning the channels specified therein to identify the channel with the strongest received control signals, if it is determined in step D that the system identification numbers do not correspond; and (G) repeating steps D-F until a correspondence is determined or until all number assignment modules have been selected.

12. The method of claim 11, wherein:

i. said scanning step includes identifying the control channels having both the strongest and the next-strongest received control signals, and ii. said step of determining whether system identification numbers correspond includes determining if either one of the system identification numbers derived from the strongest and the next strongest received control signals corresponds to the system identification number derived from the selected number assignment module; and iii. if so, tuning to the control channel associated with the system identification number that corresponds to the number derived from the selected number assignment module and requesting communication service using the mobile identification number stored in the associated selected number assignment module.

13. The method of claim 11 further comprising the step of specifying an order in which the number assignment modules are to be selected.

14. The method of claim 11 further comprising the step of specifying an order in which the control channels are to be scanned.

15. The method of claim 10 further including the steps of:

(F) if in step D the numbers do not match, selecting a next number assignment module and determining if there is a correspondence between the system identification number derived from the strongest received control signal and the system identification number derived from this next number assignment module;

(G) repeating steps E and F until a correspondence is determined or until all number assignment modules have been selected.

16. The method of claim 15 further including the steps of:

(H) if no correspondence is determined in step G, selecting a next number assignment module and scanning the channels specified therein to determine the channel with the strongest control signals; and (I) repeating steps D-H until a correspondence is determined or until all number assignment modules have been selected.

* * * * *